United States Patent [19]

Takizawa et al.

[11] Patent Number: 5,730,103
[45] Date of Patent: Mar. 24, 1998

[54] FUEL SUPPLY CONTROL SYSTEM FOR INTERNAL COMBUSTION ENGINES

[75] Inventors: Osamu Takizawa; Yosuke Tachibana, both of Wako, Japan

[73] Assignee: Honda Giken Kogyo Kabushiki Kaisha, Tokyo, Japan

[21] Appl. No.: 787,471

[22] Filed: Jan. 22, 1997

[30] Foreign Application Priority Data

Jan. 22, 1996 [JP] Japan ..................... 8-26227

[51] Int. Cl.$^6$ ..................................... F02D 33/00
[52] U.S. Cl. ........................................... 123/333
[58] Field of Search ........................ 123/333, 335; 364/426.03

[56] References Cited

U.S. PATENT DOCUMENTS

| | | | |
|---|---|---|---|
| 5,113,821 | 5/1992 | Fukui et al. | 123/335 |
| 5,385,128 | 1/1995 | Kratt et al. | 123/335 |
| 5,390,637 | 2/1995 | Yoshioka et al. | 123/333 |
| 5,417,191 | 5/1995 | Togai et al. | 123/333 |
| 5,559,703 | 9/1996 | Iwata et al. | 364/426.03 |

FOREIGN PATENT DOCUMENTS

61-66839  4/1986  Japan ................. 123/333

*Primary Examiner*—Raymond A. Nelli
*Attorney, Agent, or Firm*—Nikaido, Marmelstein, Murray & Oram LLP

[57] ABSTRACT

A fuel supply control system for an internal combustion engine installed in a vehicle controls fuel supply to the engine such that supply of fuel to the engine is interrupted when the rotational speed of the engine exceeds a first predetermined value, and the supply of fuel to the engine is resumed when the rotational speed of the engine decreases a second predetermined value which is lower than the first predetermined value. The first predetermined value is decreased when the temperature of the engine exceeds a predetermined value over a predetermined time period. The operation of at least one of accessories of the vehicle is interrupted when the first predetermined value is decreased.

7 Claims, 7 Drawing Sheets

FUEL SUPPLY CONTROL SYSTEM FOR INTERNAL COMBUSTION ENGINES

BACKGROUND OF THE INVENTION

1. Field of the Invention

This invention relates to a fuel supply control system for internal combustion engines, and more particularly to a fuel supply control system of this kind, which is capable of preventing overheating of the engine due to overspeed thereof.

2. Prior Art

Conventionally, in order to prevent overheating of an internal combustion engine for automotive vehicles, which is equipped with an electronic control fuel injection system, it has been employed to cut off fuel supply to the engine when the rotational speed of the engine exceeds a predetermined value and resume the fuel supply when the engine rotational speed drops below a predetermined value which is lower than the first-mentioned predetermined value. Further, there has been proposed a fuel cut control system, for example, by Japanese Laid-Open Patent Publication (Kokai) No. 61-66839, which cuts off fuel supply to the engine when the engine rotational speed exceeds a predetermined fuel cut-effecting speed to prevent overspeed of the engine. According to the proposed system, when the engine rotational speed exceeds a predetermined fuel cut-effecting speed during racing of the engine, the predetermined fuel cut-effecting speed is progressively lowered to a lower limit value thereof, to prevent damage to the engine.

Even if the predetermined fuel cut-effecting speed is progressively lowered to the lower limit value as in the prior art, however, there is still a possibility that the engine undergoes overheating.

SUMMARY OF THE INVENTION

It is the object of the invention to provide a fuel supply control system for internal combustion engines, which is capable of controlling fuel cut of the engine with a lesser possibility of overheating of the engine.

To attain the above object, the present invention provides a fuel supply control system for an internal combustion engine installed in a vehicle having accessories driven by said engine, comprising:

rotational speed-detecting means for detecting rotational speed of the engine;

fuel supply control means for interrupting supply of fuel to the engine when the rotational speed of the engine detected by the rotational speed-detecting means exceeds a first predetermined value, and resuming the supply of fuel to the engine when the rotational speed of the engine detected by the rotational speed-detecting means decreases a second predetermined value which is lower than the first predetermined value;

engine temperature-detecting means for detecting a temperature of the engine;

decreasing means for decreasing the first predetermined value when the temperature of the engine detected by the engine temperature-detecting means exceeds a predetermined value over a predetermined time period; and interrupting means for interrupting operation of at least one of the accessories when the first predetermined value is decreased by the decreasing means.

Preferably, the at least one of the accessories includes a compressor of an air conditioner installed in the vehicle.

More preferably, the fuel supply control system includes refrigerant pressure-detecting means for detecting refrigerant pressure of the air conditioner, and the interrupting means is operable when the refrigerant pressure of the air conditioner detected by the refrigerant pressure-detecting means exceeds a predetermined value.

Preferably, the fuel supply control system includes vehicle speed-detecting means for detecting traveling speed of the vehicle, and the decreasing means is operable when the traveling speed of the vehicle detected by the vehicle speed-detecting means is below a predetermined value.

Advantageously, the decreasing means is operable when the rotational speed of the engine detected by the rotational speed-detecting means exceeds a third predetermined value which is lower than the second predetermined value.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
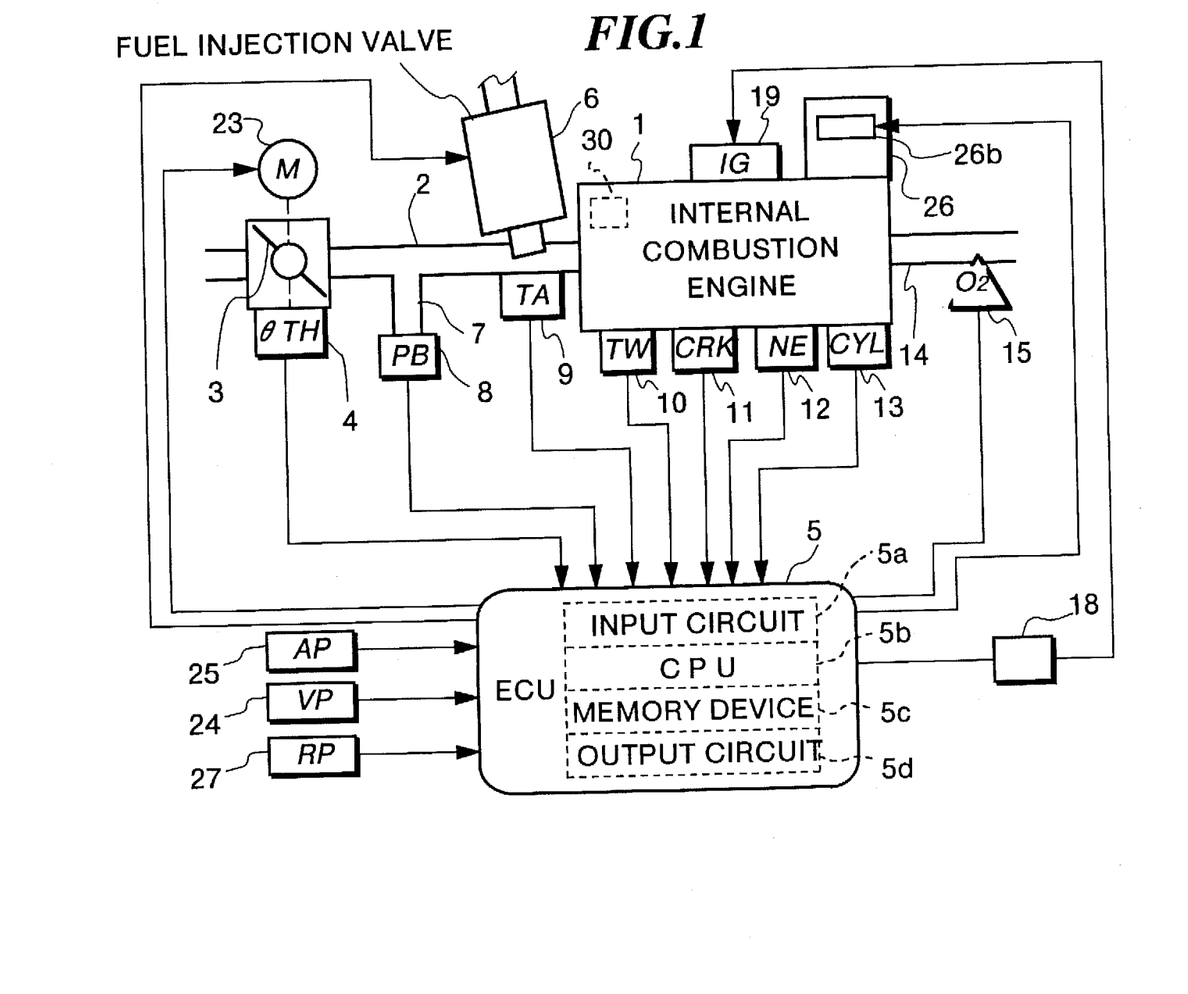
FIG. 1 is a block diagram showing the whole arrangement of an internal combustion engine incorporating a fuel supply control system therefor, according to an embodiment of the invention.

Referring first to FIG. 1, there is shown the whole arrangement of an internal combustion engine incorporating a fuel supply control system therefor, according to an embodiment of the invention.

In the figure, reference numeral 1 designates an internal combustion engine (hereinafter simply referred to as "the engine") of a DOHC straight four-cylinder type, each cylinder being provided with a pair of intake valves and a pair of exhaust valves, none of which are shown. The engine 1 has a valve timing changeover device 30 which changes valve timing (valve operative state, such as valve lift and valve opening period) of the intake valves and exhaust valves between a high-speed valve timing suitable for operation of the engine in a high rotational speed region and a low-speed valve timing suitable for operation of the engine in a low rotational speed region.

The valve timing changeover device 30 is electrically connected to an electronic control unit (hereinafter referred to as "the ECU") 5 to be selectively controlled to the high-speed valve timing and the low-speed valve timing in response to operating conditions of the engine. Further, a sensor, not shown, is electrically connected to the ECU 5, which detects abnormality of the device 30 as well as the selected valve timing.

Connected to the cylinder block of the engine 1 is an intake pipe 2 in which is arranged a throttle valve 3. A throttle valve opening (TH) sensor 4 is connected to the throttle valve 3, for generating an electric signal indicative of the sensed throttle valve opening TH and supplying the same to the ECU 5.

Further connected to the ECU 5 are a throttle actuator 23 for driving the throttle valve 3, and an accelerator pedal opening (AP) sensor 25 for detecting the accelerator pedal opening AP of an accelerator pedal, not shown, of an automotive vehicle in which the engine 1 is installed. The ECU 5 is supplied with an electric signal indicative of the sensed accelerator pedal opening AP, and drives the throttle actuator 23, based on the accelerator pedal opening AP.

Fuel injection valves 6, only one of which is shown, are inserted into the interior of the intake pipe 2 at locations intermediate between the cylinder block of the engine 1 and the throttle valve 3 and slightly upstream of respective corresponding intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 opening into the intake pipe 2 at a location immediately downstream of the throttle valve 3, for supplying an electric signal indicative of the sensed absolute pressure PBA within the intake pipe 2 to the ECU 5. An intake air temperature (TA) sensor 9 is inserted into the intake pipe 2 at a location downstream of the PBA sensor 8, for supplying an electric signal indicative of the sensed intake air temperature TA to the ECU 5. An oxygen sensor 15 is arranged in an exhaust pipe 14 extending from the cylinder block of the engine 1, for detecting the concentration of oxygen (O2) in exhaust gases emitted from the engine 1 and supplying the detected oxygen concentration to the ECU 5.

An engine coolant temperature (TW) sensor 10 as engine temperature-detecting means, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating sensor (hereinafter referred to as "the CYL sensor") 13, an engine rotational speed (NE) sensor 12, and a crank angle sensor (hereinafter referred to as "the CRK sensor") 11 are arranged in facing relation to a camshaft or a crankshaft of the engine 1, neither of which is shown. The CYL sensor 13 generates a signal pulse (hereinafter referred to as "a CYL signal pulse") at a predetermined crank angle position of a particular cylinder of the engine 1, and the NE sensor 12 as rotational speed-detecting means generates a signal pulse (hereinafter referred to as "a TDC signal pulse") at one of predetermined crank angle positions (e.g. whenever the crankshaft rotates through 180 degrees when the engine is of a four-cylinder type) which corresponds to a predetermined crank angle before a top dead point (TDC) of each cylinder corresponding to the start of the intake stroke of the cylinder. The CRK sensor 11 generates a signal pulse (hereinafter referred to as "a CRK signal pulse") at each of predetermined crank angle positions whenever the crankshaft rotates through a predetermined angle (e.g. 30 degrees) with a predetermined repetition period shorter than the repetition period of TDC signal pulses. The CYL signal pulse, the TDC signal pulse, and the CRK signal pulse are supplied to the ECU 5.

Each cylinder of the engine 1 has a spark plug 19 electrically connected to the ECU 5 via a distributor 18. Further, a compressor 26 of an air conditioner, not shown, is connected to the engine 1 to be driven thereby via an air conditioner clutch 26a which is electrically connected to the ECU 5.

Further electrically connected to the ECU 5 are a vehicle speed sensor 24 for detecting the traveling speed VP of the vehicle, and an air conditioner refrigerant pressure sensor 27 for detecting refrigerant pressure PR at an outlet of the compressor of the air conditioner.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, a memory device 5c storing various operational programs which are executed by the CPU 5b, and for storing results of calculations therefrom, etc., and an output circuit 5d which outputs driving signals to the fuel injection valves 6, the distributor 18, and the air conditioner clutch 26a, etc.

The CPU 5b operates in response to the above-mentioned signals from the sensors to determine various operating conditions in which the engine 1 is operating, such as an air-fuel ratio feedback control region where the air-fuel ratio of a mixture supplied to the engine 1 is controlled in response to the detected oxygen concentration in exhaust gases, and open-loop control regions other than the air-fuel ratio feedback control region, and calculates, based upon the determined operating conditions, the valve opening periods or fuel injection periods Tout over which the fuel injection valves 6 are to be opened in synchronism with generation of TDC signal pulses.

The CPU 5b further calculates the ignition timing θIG of the spark plug 19, based on the detected operating condition of the engine, and outputs, via the output circuit 5d, driving signals for driving the fuel injection valves 6 according to the above Tout value, and driving signals for driving the spark plugs 19 according to the ignition timing θIG.

Figure 2:
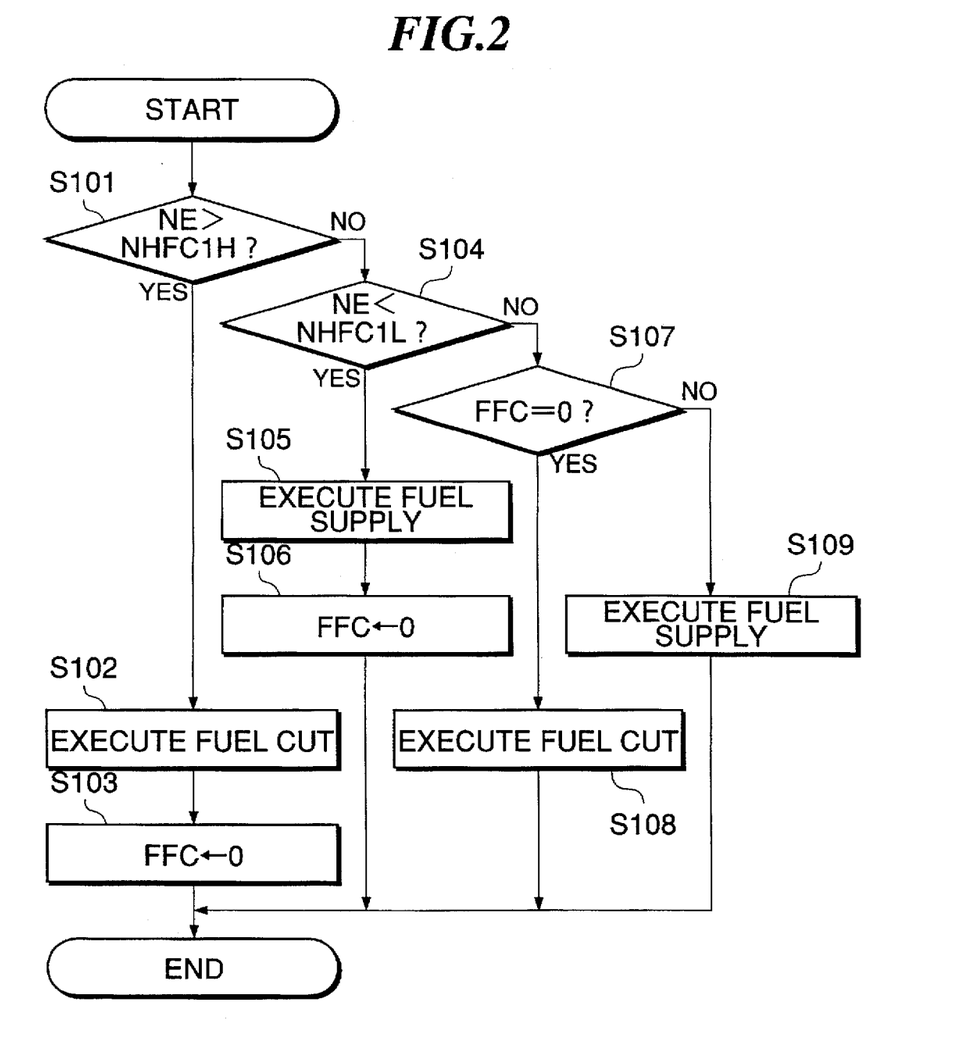
FIG. 2 is a flowchart showing a program for carrying out fuel cut control according to the embodiment.

FIG. 2 shows a program for carrying out fuel cut control according to the embodiment.

According to the present processing, to prevent overheating of the engine 1 due to overspeed thereof, fuel supply to the engine 1 is cut off when the engine rotational speed NE exceeds a predetermined fuel cut rotational speed NHFC1. This predetermined fuel cut rotational speed NHFC1 is provided with hysteresis, i.e., a fuel cut-effecting rotational speed value NHFC1H (e.g. 6500 rpm or 7700 rpm) applied when the engine rotational speed NE rises, and a fuel cut-terminating rotational speed value NHFC1L (e.g. 6200 rpm or 7500 rpm) applied when the engine rotational speed NE lowers. That is, fuel cut is carried out when the engine rotational speed NE rises across the fuel cut-effecting rotational speed value NHFC1H, while fuel supply is resumed when the engine rotational speed NE lowers across the fuel cut-terminating rotational speed value NHFC1L.

Similarly, other engine rotational speeds as determining values, hereinafter referred to, will be suffixed with H/L if they are provided with hysteresis.

First, at a step S101, it is determined whether or not the engine rotational speed NE exceeds the fuel cut-effecting rotational speed value NHFC1H, and if the NE value exceeds the fuel cut-effecting rotational speed value NHFC1H, fuel supply is cut off at a step S102, and then a flag FFC which, when set to "0", indicates that the engine 1 is in a fuel supply state, is set to "1" at a step S103, followed by terminating the present routine.

If the engine rotational Speed NE is equal to or lower than the fuel cut-effecting rotational speed value NHFC1H, the program proceeds to a step S104, wherein it is determined whether or not the engine rotational speed NE is below the fuel cut-terminating rotational speed value NHFC1L. If NE<NHFC1L holds, fuel supply to the engine 1 is resumed at a step S105, and then the flag FFC is set to "0" at a step S106, followed by terminating the present routine.

If the NE value exceeds the fuel cut-terminating rotational speed value NHFC1L at the step S104, the program proceeds to a step S107, wherein it is determined whether or not the flag FFC is equal to "1". If FFC=1 holds, the fuel cut state of the engine 1 is maintained at a step S108, followed by terminating the present routine. On the other hand, if FFC=0 holds, the fuel supply state is maintained at a step S109, followed by terminating the present routine.

According to the present embodiment, to prevent overheating of the engine 1, if the engine rotational speed NE exceeds the predetermined fuel cut engine rotational speed NHFC1H/L, the rotational speed value NHFC1H/L is progressively lowered to its lower limit value. More specifically, progressive lowering of the fuel cut engine rotational speed NHFC1H/L is carried out according to a program shown in FIGS. 3A and 3B for calculating the fuel cut engine rotational speed NHFC1H/L. The present program is executed by the CPU 5b at predetermined time intervals.

Figure 3A:
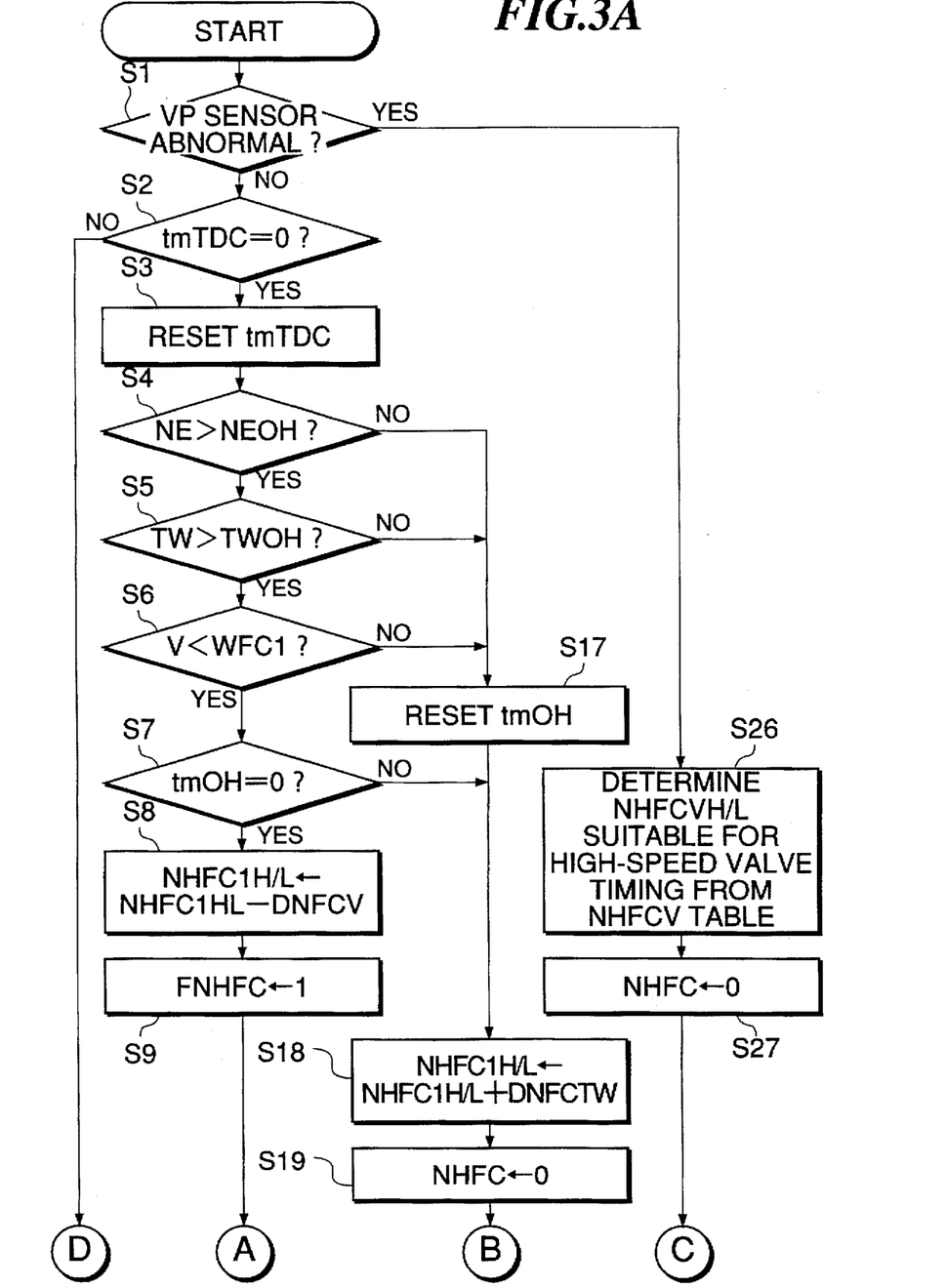
FIG. 3A is a flowchart showing a program for calculating a fuel cut engine rotational speed NHFC1H/L for prevention of overspeed of the engine.
Figure 3B:
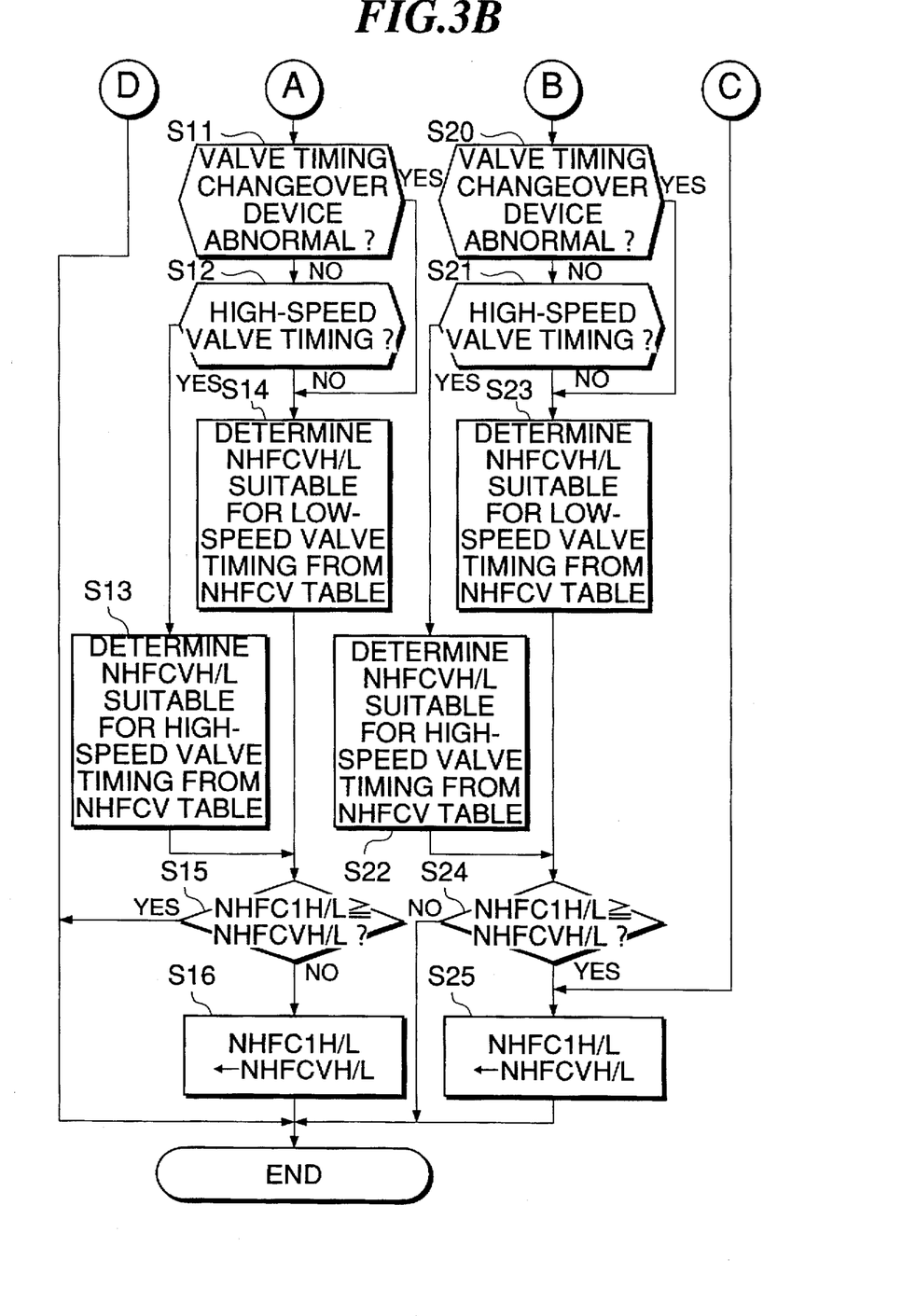
FIG. 3B is a continued part of the flowchart of FIG. 3A.

In the following description, the fuel cut engine rotational speed NHFC1 is referred to as NHFC1H/L, because the present program carries out calculation of the fuel cut-effecting rotational speed value NHFC1H and calculation of the fuel cut-terminating rotational speed value NHFC1L in the same manner with each other, and hence the same description can be used to explain the manners of calculating the two speed values NHFC1H and NHFC1L.

First, at a step S1, it is determined whether or not the vehicle speed (VP) sensor 24 is abnormal, and if the vehicle speed sensor 24 is not abnormal, it is determined at a step S2 whether or not the count value of a down-counting timer tmTDC for inhibiting a change in the fuel cut engine rotational speed NHFC1H/L is equal to 0. The count value of the timer tmTDC is set to a predetermined value, e.g. 100 msec. Upon setting of the timer tmTDC, execution of a step S3 et seq. is inhibited until the count value of the timer tmTDC becomes equal to 0 to avoid frequent change of the fuel cut engine rotational speed NHFC1H/L.

If the count value of the timer tmTDC is equal to 0 at the step S2, which means that the time period for inhibiting a change in the fuel cut engine rotational speed NHFC1H/L has elapsed, the count value of the timer tmTDC is reset to the predetermined value (e.g. 100 msec) at the step S3. Then, it is determined at a step S4 whether or not the engine rotational speed NE exceeds a predetermined engine rotational speed NEOHH/L for engine overheating determination, i.e. for determining whether the engine 1 is in a condition where it can become overheated. The predetermined engine rotational speed NEOH is also provided with hysteresis, similarly to the fuel cut engine rotational speed NHFC1, i.e. a rotational speed value NEOHH (e.g. 6000 rpm) applied when the engine rotational speed NE rises, and a rotational speed value NEOHL (e.g. 3000 rpm) applied when the engine rotational speed NE lowers.

If the engine rotational speed NE exceeds the predetermined value NEOHH/L at the step S4, the program proceeds to a step S5, wherein it is determined whether or not the engine coolant temperature TW exceeds a predetermined value TWOH (e.g. 50° C.) for engine overheating determination.

If the engine coolant temperature TW exceeds the predetermined value TWOH at the step S5, the program proceeds to a step S6, wherein it is determined whether or not the vehicle speed VP is below a predetermined value WFC1 (e.g. 20 km/h) for setting the fuel cut engine rotational speed NHFC1H/L.

If the vehicle speed VP is below the predetermined value WFC1 at the step S6, the program proceeds to a step S7, wherein it is determined whether or not the count value of a delay timer tmOH for inhibiting a change in the fuel cut engine rotational speed NHFC1H/L is equal to 0. The count value of the delay timer tmOH is set to a predetermined time period, e.g. 60 sec. If the count value of the delay timer tmOH is equal to 0 at the step S7, which means that the predetermined time period has elapsed, the program proceeds to a step S8.

The delay timer tmOH is reset at a step S17, referred to hereinafter. More specifically, if the engine rotational speed NE exceeds the predetermined value NEOHH/L at the step S4, the engine coolant temperature TW exceeds the predetermined value TWOH at the step S5, and at the same time the vehicle speed VP is below the predetermined value WFC1, execution of the step S8 et seq. is inhibited until the count value of the delay timer tmOH becomes equal to 0.

Figure 4:
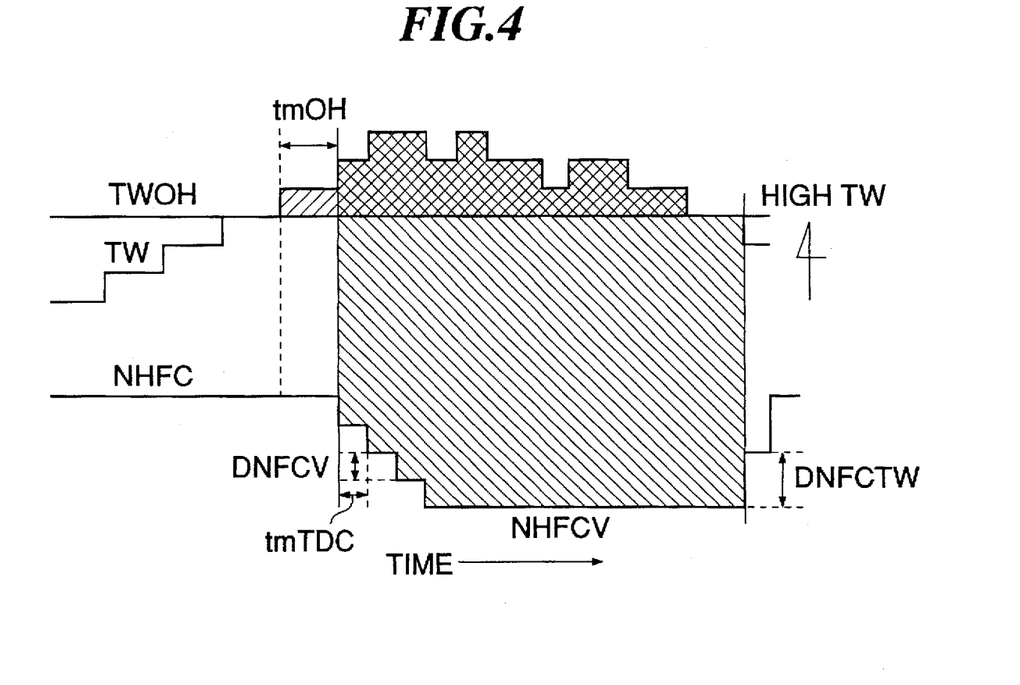
FIG. 4 is a graph useful in explaining how the fuel cut engine rotational speed NHFC1H/L is controlled.

At the step S8, a predetermined decrement DNFCV is subtracted from a present value of the fuel cut engine rotational speed NHFC1H/L, and the resulting value is set to a new value of the fuel cut engine rotational speed NHFC1H/L. The predetermined decrement DNFCV is set, e.g. to 23.3 rpm. As a result, the fuel cut engine rotational speed NHFC1H/L is progressively decreased, as shown in FIG. 4 showing changes in the fuel cut engine rotational speed NHFC1H/L.

Then, at a step S9, a flag FNHFC which, when set to "1", indicates that the fuel cut engine rotational speed NHFC1H/L is being progressively decreased, is set to "1".

At a step S11, it is determined whether or not the valve timing changeover device 30 is abnormal. If it is not abnormal, the program proceeds to a step S12, wherein it is determined whether or not the valve timing is set to the high-speed valve timing. If the valve timing is set to the high-speed valve timing, the program proceeds to a step S13, wherein a value NHFCVH1 or NHFCVL1 of a fuel cut engine rotational speed NHFCVH/L suitable for the high-speed valve timing is determined from a solid line 81 or 82 in an NHFCV table shown in FIG. 5.

Figure 5:
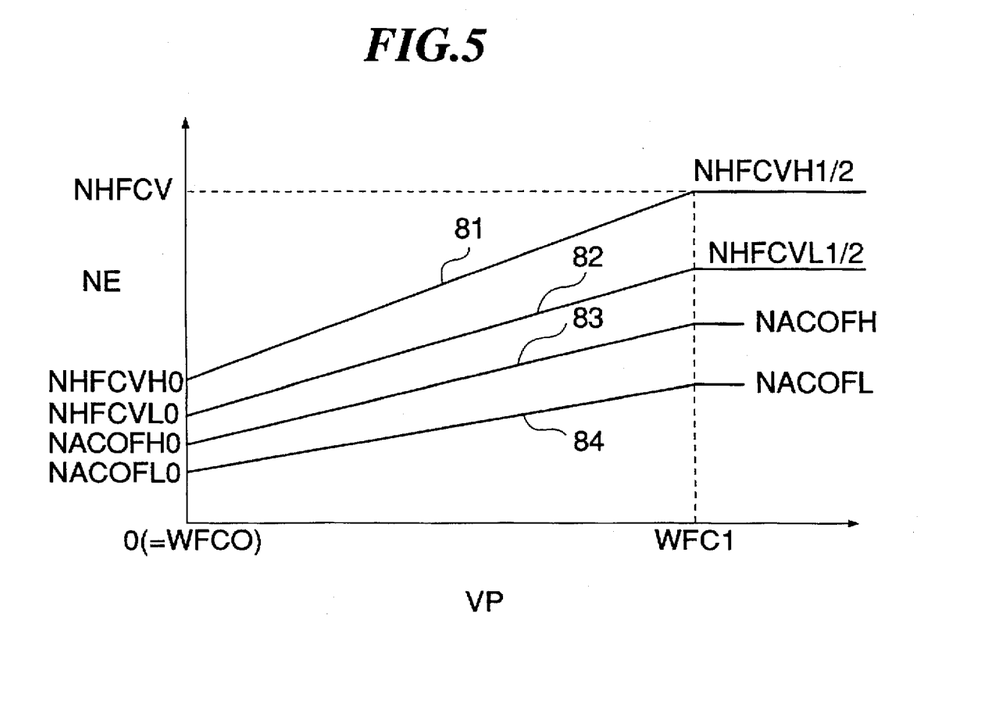
FIG. 5 shows tables which are used for determining predetermined engine rotational speed values including a fuel cut engine rotational speed NHFCVH/L dependent upon valve timing of intake valves and/or exhaust valves.

On the other hand, if the valve timing is set to the low-speed valve timing, the program proceeds to a step S14, wherein a value of the fuel cut engine rotational speed NHFCVH/L suitable for the low-speed valve timing is determined from the solid line 81 or 82 in the NHFCV table.

Also the fuel cut engine rotational speed lower limit NHFCV is provided with hysteresis. In FIG. 5, NHFCVH represents a fuel cut-effecting rotational speed value, and NHFCVL a fuel cut-terminating rotational speed value. Further, symbol 1/2 of the values NHFCVH1/2 and NHFCVL1/2 indicate that the value is for the low speed valve timing or for the high speed valve timing. That is, 1 of 1/2 means that the value is for the low speed valve timing, and 2 means that the value is for the higher speed valve timing. In the figure, the solid line 81 depicts a single line representative of a change in the fuel cut-effecting rotational speed value as being suitable for both the high-speed valve timing and the low-speed valve timing for the sake of convenience, though the actual values of the values NHFCVH1 and NHFCVH2 are different from each other. This is the same with the solid line 82. In the following description the symbols 1/2 will be omitted from the values NHFCVH1/2 and NHFCVL1/2 for the sake of convenience.

Referring again to FIG. 3B, if it is determined at the step S11 that the valve timing changeover device 30 is abnormal, the program skips the step S12 over to the step S14 to execute the aforesaid processing.

After execution of the step S13 or S14, the program proceeds to a step S15, wherein it is determined whether or not the fuel cut engine rotational speed NHFC1H/L is equal to or higher than the fuel cut engine rotational speed NHFCVH/L. If the former is lower than the latter, the program proceeds to a step S16, wherein the fuel cut engine rotational speed NHFC1H/L is set to the fuel cut engine rotational speed NHFCVH/L, followed by terminating the present routine. On the other hand, if the fuel cut engine rotational speed NHFC1H/L is equal to or higher than the fuel cut engine rotational speed NHFCVH/L, the fuel cut engine rotational speed NHFC1H/L is maintained as it is, followed by terminating the present routine. In this manner, the fuel cut engine rotational speed NHFCVH/L determined based on the present vehicle speed VP value is set as the lower limit value for the fuel cut engine rotational speed NHFC1H/L.

On the other hand, if it is determined at the respective steps S4, S5 and S6 that the engine rotational speed NE is lower than the predetermined value NEOH, the engine coolant temperature TW is lower than the predetermined value TWOH, and at the same time the vehicle speed VP is higher than the predetermined value WFC1, the delay timer tmOH is reset at the step S17, followed by the program proceeding to a step S18. At the step S18, a predetermined increment DNFCTW is added to the fuel cut engine rotational speed NHFC1H/L to thereby obtain a new value of the fuel cut engine rotational speed NHFC1H/L. The predetermined increment is set, e.g. to 675 rpm. Then, the flag FNHFC is set to 0. Thus, the fuel cut engine rotational speed NHFC1H/L is progressively increased, as shown in FIG. 4.

Then, at a step S20, it is determined whether or not the valve timing changeover device 30 is abnormal. If it is not abnormal, it is determined at a step S21 whether or not the valve timing is set to the high-speed valve timing If the answer is affirmative, the program proceeds to a step S22, wherein a value of the fuel cut engine rotational speed NHFCVH/L suitable for the high-speed valve timing is determined from the NHFCV table, similarly to the step S13. On the other hand, if the valve timing is set to the low-speed valve timing, the program proceeds to a step S23, wherein a value of the fuel cut engine rotational speed NHFCVH/L suitable for the low-speed valve timing is determined from the NHFCV table, followed by the program proceeding to a step S24.

If it is determined at the step S20 that the valve timing changeover device 30 is abnormal, the program skips the step S21 over to the step S23 to execute the aforesaid processing is executed.

At the step S24, it is determined whether or not the fuel cut engine rotational speed NHFC1H/L is equal to or higher than the fuel cut engine rotational speed NHFCVH/L. If the value NHFC1H is equal to or higher than the value HNFCVH/L, the program proceeds to a step S25, wherein the fuel cut engine rotational speed NHFC1H/L is set to the fuel cut engine rotational speed NHFCVH/L, followed by terminating the present routine. On the other hand, if the fuel cut engine rotational speed NHFC1H/L is lower than the fuel cut engine rotational speed NHFCVH/L, the fuel cut engine rotational speed NHFC1H/L is maintained as it is, followed by terminating the present routine. In this manner, the fuel cut engine rotational speed NHFCVH/L is set as the upper limit value for the fuel cut engine rotational speed NHFC1H/L.

If it is determined at the steps S2 that the count value of the timer tmTDC is not equal to 0, it means that the time period for inhibiting a change in the fuel cut engine rotational speed NHFC1H/L has not elapsed, and therefore the program is immediately terminated.

Further, if it is determined at the step S1 that the vehicle speed sensor 24 is abnormal, the vehicle speed VP is regarded as a value larger than the predetermined value WFC1 for fail-safe operation, followed by the program proceeding to a step S26. At the step S26, a value of the fuel cut engine rotational speed NHFCVH/L is determined from the NHFCV table, and the flag NFHC is set to 0 at a step S27. Then, at the step S25, the fuel cut engine rotational speed NHFC1H/L is set to the fuel cut engine rotational speed NHFCVH/L, followed by terminating the present routine.

Figure 6A:
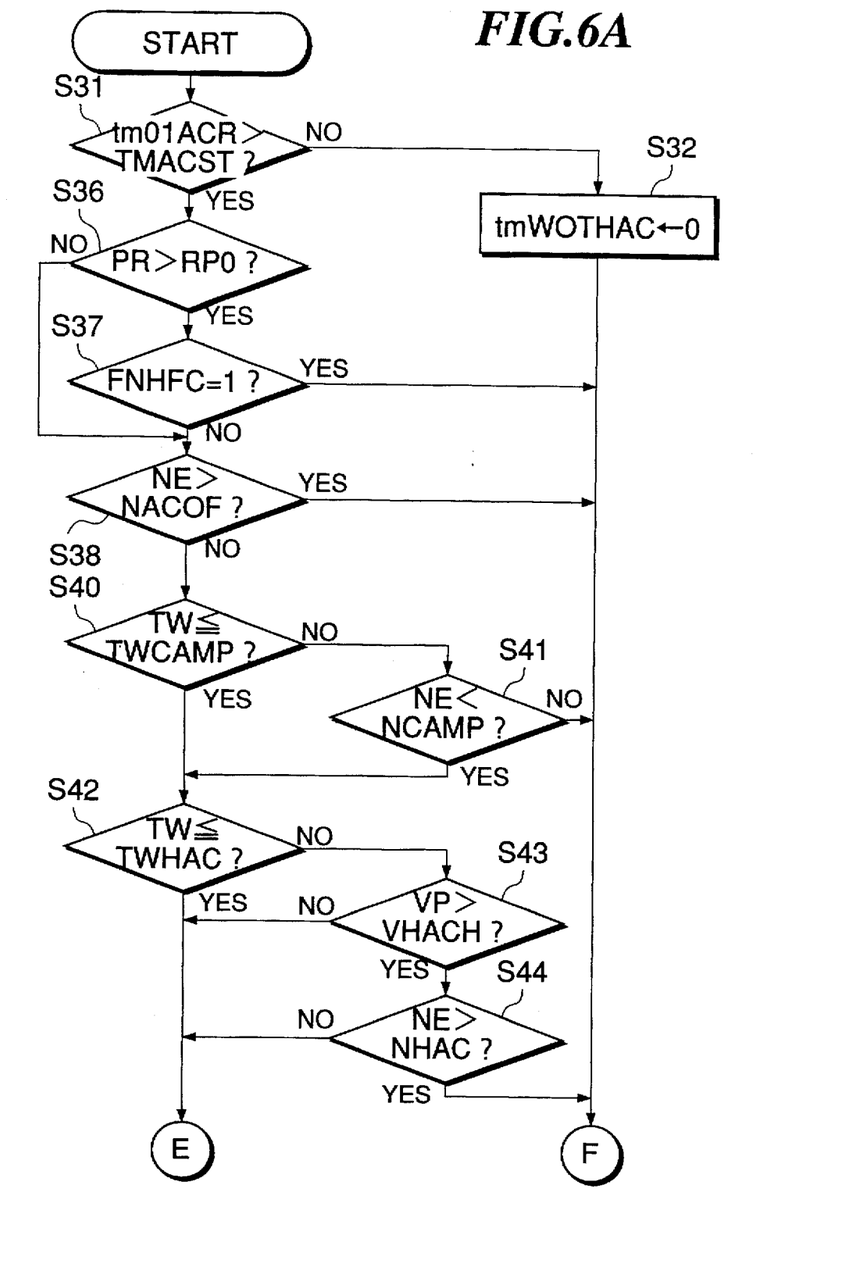
FIG. 6A is a flowchart showing a program for controlling on/off-operation of a clutch of a compressor of an air conditioner driven by the engine.
Figure 6B:
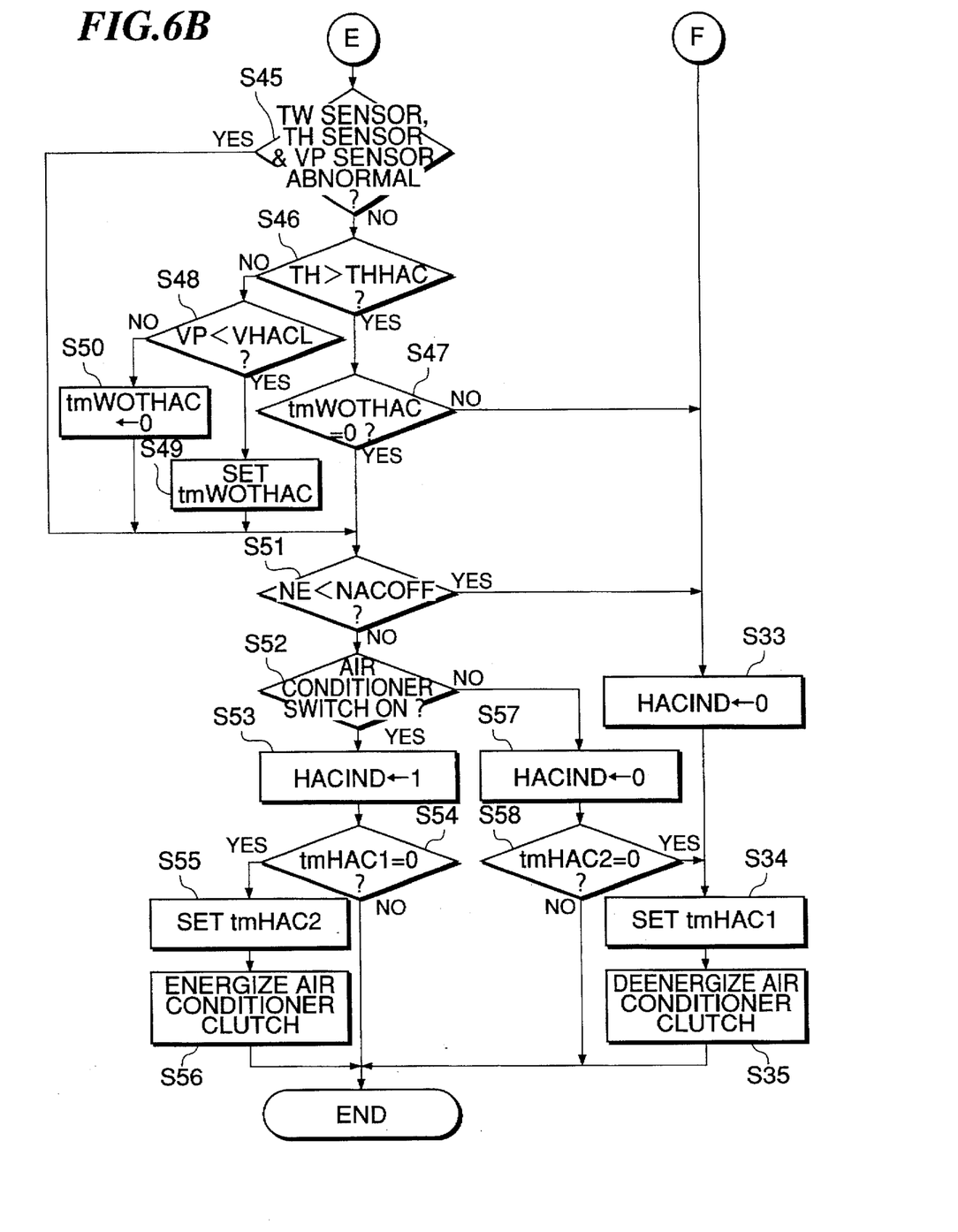
FIG. 6B is a continued part of the flowchart of FIG. 6A.

Next, air-conditioner clutch control will be described hereinbelow with reference to FIGS. 6A and 6B.

First, at a step S31, it is determined whether or not the count value of an up-counting timer tm01ACR which counts a time period elapsed after the start of the engine exceeds a predetermined air conditioner off-timer value TMACST over which the air conditioner is to be kept inoperative after the start of the engine. The timer value TMACST is set, e.g. to 2.5 sec.

If the count value of the timer tm01ACR does not exceed the timer value TMACST at the step S31, the count value of a timer tmWOTHAC for counting an air conditioner-off time period over which the air conditioner is to be kept inoperative after the start of the vehicle is set to 0 at a step S32. Then, a flag HACIND which, when set to "1", indicates that the amount of intake air supplied to the engine is to be increased, is set to 0 at a step S33, an air conditioner clutch energization delay timer tmHAC1 is set and started at a step S34, and the air conditioner clutch 26a is turned off at a step S35, followed by terminating the present routine.

If the count value of the timer tm01ACR exceeds the timer value TMACST at the step S31, it is determined at a step S36 whether or not the air conditioner refrigerant pressure PR exceeds a predetermined value PR0. If the PR value exceeds the predetermined value PR0, the program proceeds to a step S37, wherein it is determined whether or not the flag FNHFC is equal to "1" If the answer is affirmative (YES), the air conditioner clutch 26a is kept off after execution of the steps S33 and S34, followed by terminating the present routine.

That is, according to the present embodiment, if the flag FNHFC is set to "1" (see step S9 in FIG. 3), the fuel cut engine rotational speed NHFC1H/L is being progressively decreased by the steps S4 to S8 to prevent overheating of the engine 1, and during the progressive decrease of the fuel cut engine rotational speed, the air conditioner clutch 26a is kept off to reduce the load on the engine 1.

If it is determined at the step S37 that the flag FNHFC is not equal to "1", or if the air conditioner refrigerant pressure PR is equal to or below the predetermined value PR0, the program proceeds to a step S38, wherein it is determined whether or not the engine rotational speed NE exceeds a first predetermined air conditioner-off value NACOFH/L. If the engine rotational speed NE exceeds the predetermined value NACOFH/L, the air conditioner clutch 26a is turned off at the step S35 after execution of the steps S33 and S34, followed by terminating the present routine.

If the engine rotational speed NE is equal to or below the predetermined value NACOFH/L, the program proceeds to a step S40, wherein it is determined whether or not the engine coolant temperature TW is equal to or below a first predetermined air conditioner-off value TWCAMP (e.g. 114° C.) which is applied, e.g. when the vehicle is drawing a trailer. If the engine coolant temperature TW exceeds the first predetermined value TWCAMP, the program proceeds to a step S41, wherein it is determined whether or not the engine rotational speed NE is below a second predetermined air conditioner-off value NCAMP (e.g. from 1900 to 2100 rpm, NACOF>NCAMP). If the engine rotational speed NE is equal to or higher than the second predetermined value NCAMP, the air conditioner clutch 26a is turned off after execution of the steps S33 and S34, followed by terminating the present routine.

If the engine coolant temperature TW is determined to be equal to or below the first predetermined value TWCAMP at the step S40, or if the engine rotational speed NE is determined to be below the second predetermined value NCAMP at the step S41, the program proceeds to a step S42, wherein it is determined whether or not the engine coolant temperature TW is equal to or below a second predetermined air conditioner-off value TWHAC (e.g. 109° C., TWCAMP>TWHAC). If the answer is negative (NO), it is determined at a step S43 whether or not the vehicle speed VP exceeds a first predetermined air conditioner-off value VHACH. If the answer is affirmative (YES), then it is determined at a step S44 whether or not the engine rotational speed NE exceeds a third predetermined air conditioner-off value NHAC (NCAMP>NHAC). If the answer is affirmative (YES), the air conditioner clutch 26a is turned off at the step S35 after execution of the steps S33 and S34, followed by terminating the present routine.

If the engine coolant temperature TW is determined to be equal to or below the second predetermined value TWHAC at the step S42, if the vehicle speed VP is determined to be equal to or below the predetermined value VHACH at the step S43, or if the engine rotational speed NE is determined to be equal to or below the third predetermined value NHAC at the step S44, the program proceeds to a step S45, wherein it is determined whether or not any of the engine coolant temperature (TW) sensor 10, the throttle valve opening (TH) sensor 4, and the vehicle speed (VP) sensor 24 is defective.

If none of the sensors are determined to be defective at the step S45, then it is determined at a step S46 whether or not the throttle valve opening TH exceeds a predetermined air conditioner-off value THHAC (e.g. 40°) applied immediately after the start of the vehicle. If the answer is affirmative, the program proceeds to a step S47, wherein it is determined whether or not the count value of the timer tmWOTHAC is equal to 0.

If the count value of the timer tmWOTHAC is not equal to 0, the air conditioner clutch 26a is turned off at the step S35 after execution of the steps S33 and S34, followed by terminating the present routine. Thus, the air conditioner is held off until the predetermined time period elapses after the start of the vehicle.

If the throttle valve opening TH is equal to or below the predetermined value THHAC at the step S46, the program proceeds to a step S48, wherein it is determined whether or not the vehicle speed VP is below a second predetermined air conditioner-off value VHACLH/L (VHACH>VHACL). If the answer is affirmative (YES) at the step S48, the timer tmWOTHAC is reset at a step S49, whereas if the answer is negative (NO), the count value of the timer tmWOTHAC is set to 0 at a step S50.

On the other hand, if any of the engine coolant temperature (TW) sensor 10, the throttle valve opening (TH) sensor 4, and the vehicle speed (VP) sensor 24 is determined to be abnormal at the step S45, or when the step S49 or S50 has been executed, it is determined at a step S51 whether or not the engine rotational speed NE exceeds a fourth predetermined air conditioner-off value NACOFFH/L (NHAC>NACOFF). If the engine rotational speed NE is below the fourth predetermined value NACOFFH/L, the air conditioner clutch 26a is turned off at the step S35 after execution of the steps S33 and S34, followed by terminating the present routine.

If the engine rotational speed NE is determined to be equal to or higher than the fourth predetermined value NACOFFH/L at the step S51, the program proceeds to a step S52, wherein it is determined whether or not a power switch of the air conditioner is on. If the switch is on at the step S52, the flag HACIND which, when set to "1", indicates that the intake air amount is to be increased, is set to "1" at a step S53. Then, it is determined at the step S54 whether or not the count value of the air conditioner clutch deenergization delay timer tmHAC1 is equal to "0". If the count value of the timer tmHAC1 is determined to be equal to 0 at a step S54, which means that the delay time for air conditioner clutch energization has elapsed, an air conditioner clutch deenergization delay timer tmHAC2 is set and started at a step S55, and then the air conditioner clutch 26a is turned on at a step S56. On the other hand, if the count value of the timer tmHAC1 is determined not to be equal to 0, the program is immediately terminated.

If the air conditioner switch is determined not to be on at the step S52, the flag HACIND is set to 0 at a step S57, and then it is determined at a step S58 whether or not the count value of the timer tmHAC2 is equal to 0. If the answer is affirmative (YES), which means that the delay time for the air conditioner clutch deenergization has elapsed, the timer tmHAC1 is set and started at the step S34, followed by turning off the air conditioner clutch 26a at the step S35. If the count value of the timer tmHAC2 is not equal to 0, the program is immediately terminated.

According to the present embodiment, if the engine rotational speed NE exceeds the predetermined value NEOHH/L at the step S4, the engine coolant temperature TW exceeds the predetermined value TWOH at the step S5, and at the same time the vehicle speed VP is below the predetermined value WFC1 at the step S6, the fuel cut engine rotational speed NHFC1H/L is decremented by the predetermined decrement DNFCV after the lapse of the predetermined time period set by the delay timer tmOH at the step S7, and thereafter the value NHFC1H is decremented by the value DNFCV every predetermined time period set by the timer tmTDC at the step S2. Thus, the fuel cut engine rotational speed NHFC1H/L is progressively decreased. Then, the flag NHFC which, when set to "1", indicates that the fuel cut engine rotational speed NHFC1H/L is being progressively decreased is set to "1" at the step S9, and so long as the flag NHFC is equal to "1", the air conditioner clutch 26a is kept off at the step S35. Thus, the possibility of prevention of overheating of the engine can be decreased.

Although in the present embodiment the operation of the air conditioner compressor 26 driven by the engine 1 is stopped to prevent overheating of the engine, this is not limitative. Alternatively, at least one of other accessories of the vehicle may be stopped from operating.

Further, in a variation of the present embodiment, the first predetermined air conditioner-off value NACOF used for determining whether or not the air conditioner is to be made inoperative at the step S38 may be changed according to the vehicle speed VP as depicted by the solid line 83 (84) in the table of FIG. 5.

In FIG. 5, the solid line 83 indicates a value NACOFH of the first predetermined air conditioner-off value NACOF applied when the engine rotational speed NE increases, and the solid line 84 a value NACOFL of the same applied when the engine rotational speed NE decreases. According to the variation, the first predetermined air conditioner-off value NACOF is increased with increase of the vehicle speed VP to thereby control the operation of the air conditioner more suitably and hence more positively prevent overheating of the engine 1.

What is claimed is:

1. A fuel supply control system for an internal combustion engine installed in a vehicle having accessories driven by said engine, comprising:

rotational speed-detecting means for detecting rotational speed of said engine;

fuel supply control means for interrupting supply of fuel to said engine when said rotational speed of said engine detected by said rotational speed-detecting means exceeds a first predetermined value, and resuming said supply of fuel to said engine when said rotational speed of said engine detected by said rotational speed-detecting means decreases a second predetermined value which is lower than said first predetermined value;

engine temperature-detecting means for detecting a temperature of said engine;

decreasing means for decreasing said first predetermined value when said temperature of said engine detected by said engine temperature-detecting means exceeds a predetermined value over a predetermined time period; and interrupting means for interrupting operation of at least one of said accessories when said first predetermined value is decreased by said decreasing means.

2. A fuel supply control system as claimed in claim 1, wherein said at least one of said accessories includes a compressor of an air conditioner installed in said vehicle.

3. A fuel supply control system as claimed in claim 2, including refrigerant pressure-detecting means for detecting refrigerant pressure of said air conditioner, and wherein said interrupting means is operable when said refrigerant pressure of said air conditioner detected by said refrigerant pressure-detecting means exceeds a predetermined value.

4. A fuel supply control system as claimed in claim 1, including vehicle speed-detecting means for detecting traveling speed of said vehicle, and wherein said decreasing means is operable when said traveling speed of said vehicle detected by said vehicle speed-detecting means is below a predetermined value.

5. A fuel supply control system as claimed in claim 2, including vehicle speed-detecting means for detecting traveling speed of said vehicle, and wherein said decreasing means is operable when said traveling speed of said vehicle detected by said vehicle speed-detecting means is below a predetermined value.

6. A fuel supply control system as claimed in claim 1, wherein said decreasing means is operable when said rotational speed of said engine detected by said rotational speed-detecting means exceeds a third predetermined value which is lower than said second predetermined value.

7. A fuel supply control system as claimed in claim 2, wherein said decreasing means is operable when said rotational speed of said engine detected by said rotational speed-detecting means exceeds a third predetermined value which is lower than said second predetermined value.

\* \* \* \* \*